US012804360B2

(12) United States Patent
Radhakrishnan et al.

(10) Patent No.: US 12,804,360 B2
(45) Date of Patent: Nov. 17, 2026

(54) MOBILE TERMINATED SHORT MESSAGE SERVICE FOR NON-TERRESTRIAL NETWORK SHORT MESSAGE SERVICE DELIVERY

(71) Applicant: Skylo Technologies, Inc., Mountain View, CA (US)

(72) Inventors: Anand Radhakrishnan, Espoo (FI); Arvo Heinonen, Espoo (FI); Henry Carlson, Hyvinkää (FI); Hyoungjun Cho, Mountain View, CA (US); Vijay Lewis, Wylie, TX (US); Mohammad Furqan Ahmad, Sunnyvale, CA (US); Meghna Agrawal, Cupertino, CA (US); Andrew Nuttall, Mountain View, CA (US)

(73) Assignee: Skylo Technologies, Inc., Mountain View, CA (US)

( * ) Notice: Subject to any disclaimer, the term of this patent is extended or adjusted under 35 U.S.C. 154(b) by 299 days.

(21) Appl. No.: 18/892,651

(22) Filed: Sep. 23, 2024

(65) Prior Publication Data

US 2026/0089470 A1 Mar. 26, 2026

(51) Int. Cl.
*H04L 12/00* (2006.01)
*H04W 4/14* (2009.01)
(Continued)

(52) U.S. Cl.
CPC ............. *H04W 4/14* (2013.01); *H04W 28/06* (2013.01); *H04W 84/06* (2013.01)

(58) Field of Classification Search
CPC ........ H04W 4/14; H04W 28/06; H04W 84/06
(Continued)

(56) References Cited

U.S. PATENT DOCUMENTS 6,223,045 B1 * 4/2001 Valentine ................ H04W 4/14 455/433
8,160,623 B1 * 4/2012 Talley ..................... H04W 4/14 455/435.2
(Continued)

FOREIGN PATENT DOCUMENTS

CA 2650785 C * 6/2013 .............. H04W 4/14
EP 1374606 B1 * 5/2011 ........... H04L 51/212
(Continued)

OTHER PUBLICATIONS

3GPP. Universal Mobile Telecommunications System (UTMS); LTE; Diameter based protocols to support Short Message Service (SMS) capable Mobile Management Entities (MMEs) (3GPP TS 29.338 version 15.0.0 Release 15). ETSI TS 129 338 VI5.0.0. 2018. [retrieved on Sep. 28, 2025]. Retrieved from the Internet. <URL: https://www.etsi.org/deliver/ etsi_ts/129300_129399/129338/15.00.00_60/ts_129338vl50000p.pdf>.
(Continued)

*Primary Examiner* — Frantz Coby
(74) *Attorney, Agent, or Firm* — Brian R. Short

(57) ABSTRACT

Apparatuses, methods, and systems of delivering Mobile Terminated Short Message Service in a Non-Terrestrial Network (NTN) are disclosed. One method includes receiving a mobile terminated forward short message request (TFR) from a short message service center (SMSC), wherein the TFR includes an SMS message and delivery information for a destination wireless device the delivery information associated with the TFR, comparing the delivery information with previously stored delivery information of a previously received TFR and determining whether the TFR includes a new SMS message or an expired SMS message, forwarding the TFR to the NTN core network when the delivery information is determined to be associated with a new SMS message, and discarding without forwarding
(Continued)

subsequent retry TFRs received from the SMSC before receiving a mobile terminated forward short message answer from the NTN core network when the delivery information is determined to be associated with an expired SMS message.

20 Claims, 6 Drawing Sheets

(51) Int. Cl.
*H04W 28/06* (2009.01)
*H04W 84/06* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 8,447,335 | B2 * | 5/2013 | Agarwal | H04W 4/16 455/414.1 |
| 9,232,567 | B2 | 1/2016 | Karaoguz et al. | |
| 2006/0199597 | A1 * | 9/2006 | Wright | H04W 4/14 455/466 |
| 2011/0281594 | A1 * | 11/2011 | Goldberg | H04W 4/14 455/466 |
| 2013/0137471 | A1 * | 5/2013 | Nooren | H04W 4/14 455/466 |
| 2022/0070749 | A1 | 3/2022 | Wang et al. | |
| 2025/0374015 | A1 * | 12/2025 | Khan | H04W 4/14 |

FOREIGN PATENT DOCUMENTS

| | | | | |
|---|---|---|---|---|
| EP | 3166345 | A1 * | 5/2017 | H04W 4/12 |
| WO | WO-2010027432 | A1 * | 3/2010 | H04W 4/14 |
| WO | WO-2012145040 | A1 * | 10/2012 | H04W 4/14 |
| WO | WO-2013105976 | A1 * | 7/2013 | H04W 4/70 |
| WO | WO-2025167360 | A1 * | 8/2025 | H04W 84/06 |

OTHER PUBLICATIONS

3GPP. 5G; 5G System: Technical realization of Service Based Short Message Service; Stage 2 (3GPP TS 23.540 version 18.4.0 Release 18). ETSI TS 123.540 VI8.4.0. 2024 {retrieved on Sep. 28, 2025}. Retrieved from the Internet. <URL: https://www.etsi.org/deliver/etsi_ts/123500_123599/123540/18.04.00_60/ts_123540vl80400p.pdf>.

3rd Generation Partnership Project; Technical Specification Group Core Network and Terminals; Diameter based protocols to support Short Message Service (SMS) capable Mobile Management Entities (MMEs) (Release 17); 3GPP TS 29.338 V17.2.0 (Sep. 2023).

3rd Generation Partnership Project; Technical Specification Group Core Network and Terminals; Technical realization of the Short Message Service (SMS) (Release 17) 3GPP TS 23.040 V17.3.0 (Jun. 2023).

* cited by examiner

MOBILE TERMINATED SHORT MESSAGE SERVICE FOR NON-TERRESTRIAL NETWORK SHORT MESSAGE SERVICE DELIVERY

FIELD OF THE DESCRIBED EMBODIMENTS

The described embodiments relate generally to wireless communications. More particularly, the described embodiments relate to systems, methods, and apparatuses for a Mobile Terminated Short Message Service for non-terrestrial network (NTN) short message service (SMS).

BACKGROUND

Short Message Service (SMS) is a widely used communication feature in mobile networks that allows the transmission of text messages up to 140 bytes between User Equipment (UE) devices. Traditionally, SMS has been designed and optimized for terrestrial cellular networks, where transmission delays are typically less than 100 milliseconds.

In conventional cellular networks, the SMS architecture includes several key components. First, User Equipment (UE) is a wireless device that initiates or receives SMS messages. Second, the SMS architecture includes a Radio Access Network (RAN) which in 4G networks is an eNodeB (eNB), while in 5G networks is an gNodeB (gNB). Third, the SMS architecture includes a Core Network Entity, such as, the Mobility Management Entity (MME) in 4G or the Access and Mobility Management Function (AMF) in 5G, which handles control plane data. Fourth, the SMS architecture includes a short message service center (SMSC) that is responsible for storing, forwarding, and managing the delivery of SMS messages.

The SMS delivery process can be categorized into Mobile Originated SMS (MO-SMS) in which a wireless device sends an SMS message, and Mobile Terminated SMS (MT-SMS) in which a wireless device receives an SMS message.

In terrestrial networks, these processes are typically quick and efficient due to the low latency between network components. The SMSC usually expects to receive a response to its Mobile Terminated Forward Short Message (MT-FSM) request within a short time frame, often around 15 seconds. However, the emergence of Non-Terrestrial Networks (NTN), which utilize satellite communication, has introduced new challenges to SMS delivery. NTN differs significantly from traditional cellular networks in several key aspects including long round-trip propagation times, variable signal quality and multiple hop transmission. The long round-trip time is due to the vast distances involved in satellite communications, the signal propagation delay can range from hundreds of milliseconds to several seconds. The signal quality varies because the line-of-sight between the wireless device and the satellite can fluctuate significantly, leading to frequent disconnections and retries. In NTN, a single message transmission may involve multiple hops including satellite, potentially increasing the total transmission time to tens or even hundreds of seconds in worst-case scenarios. These characteristics of NTN create significant issues for traditional SMS delivery mechanisms. The SMSC's short transaction response waiting window, typically designed for terrestrial networks, often expires before receiving a response in NTN scenarios. This can lead to unnecessary retries and duplicate message deliveries. Even when a UE successfully receives an SMS, the SMSC may fail to update the message's delivery status due to the extended transmission delays, potentially leading to redundant delivery attempts. While it might be possible to extend the SMSC's transaction timer for NTN operations, doing so could negatively impact user experience in conventional terrestrial networks, making it an infeasible solution.

It is desirable to have methods, apparatuses, and systems for a Mobile Terminated Short Message Service for non-terrestrial network (NTN) short message service (SMS).

SUMMARY

An embodiment includes a method of delivering Mobile Terminated Short Message Service in a Non-Terrestrial Network (NTN). The method includes receiving, by an SMS delivery manager, a mobile terminated forward short message request (TFR) from a short message service center (SMSC), wherein the TFR includes an SMS message and delivery information for a destination wireless device, storing, by the SMS delivery manager, the delivery information associated with the TFR, comparing, by the SMS delivery manager, the delivery information with previously stored delivery information of a previously received TFR and determining whether the TFR includes a new SMS message or an expired SMS message, forwarding, by the SMS delivery manager, the TFR to the NTN Core Network when the delivery information is determined to be associated with a new SMS message, and discarding, by the SMS delivery manager, without forwarding subsequent retry TFRs for retry TFRs received from the SMSC before receiving a mobile terminated forward short message answer (TFA) from the NTN Core Network. when the delivery information is determined to be associated with an expired SMS message.

Another embodiment includes a system for delivering Mobile Terminated Short system includes a short message service center, a routing agent, a NTN core network, and an SMS delivery manager operating on the routing agent and the NTN core network to cause the routing agent and the NTN core network to receive a mobile terminated forward short message request (TFR) from a short message service center (SMSC), wherein the TFR includes an SMS message and delivery information for a destination wireless device, store the delivery information associated with the TFR, compare the delivery information with previously stored delivery information of a previously received TFR and determining whether the TFR includes a new SMS message or an expired SMS message, forward the TFR to the NTN Core Network when the delivery information is determined to be associated with a new SMS message, and discard forwarding subsequent retry TFRs for retry TFRs received from the SMSC before receiving a mobile terminated forward short message answer (TFA) from the NTN Core Network. when the delivery information is determined to be associated with an expired SMS message.

Other aspects and advantages of the described embodiments will become apparent from the following detailed description, taken in conjunction with the accompanying drawings, illustrating by way of example the principles of the described embodiments.

DETAILED DESCRIPTION

Figure 1:
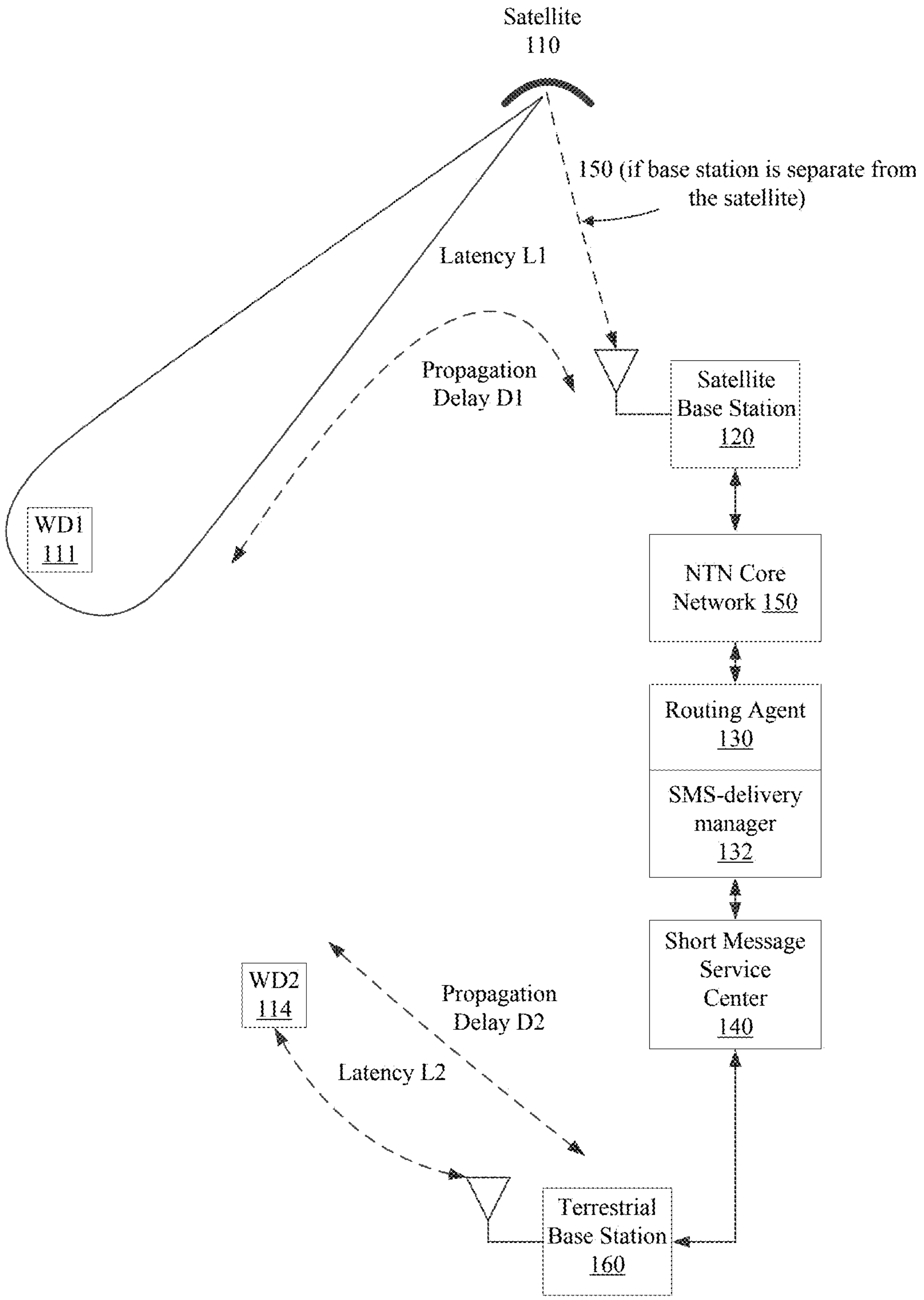
FIG. 1 shows a communication network that includes both terrestrial networks and non-terrestrial networks for communicating to wireless devices, according to an embodiment.

The embodiments described include methods, apparatuses, and systems for a communication network that includes an SMS delivery manager for non-terrestrial network (NTN) short message service (SMS). The described embodiments address challenges of delivering Short Message Service (SMS) messages in Non-Terrestrial Networks (NTN) by introducing the SMS delivery manager that acts as an intermediary between the Short Message Service Center (SMSC) and the NTN core network. As described, the SMS delivery manager can be included within a routing agent of the communication network forming an enhanced routing agent, or the SMS delivery manager may be included in the NTN core network, or the functionality of the SMS delivery manager may be partially included in both the routing agent and the NTN core network. The described embodiments allow for efficient SMS delivery in high-latency satellite networks without requiring modifications to existing SMSC operations.

The described embodiment includes methods, apparatuses, and systems for MT SMS (Mobile Terminated Short Message Service) delivery that account for the relatively long transmission delays in Non-Terrestrial Networks (NTN) without modifying the current operations of the SMSC. These embodiments can be realized through modifications to the functionality of the routing agent and/or modifications of the functionality of the NTN core network of the communication network.

While a conventional routing agent merely verifies the destination address and determines an appropriate transmission path, an enhanced routing agent of at least some of the described embodiments introduces new functionalities, including storing and identifying Terminate-Forward-Request (TFR) information, modifying information during Terminate-Forward-Answer (TFA) transmission, and generating Dummy Mobile-Originated SMS (MO-SMS) (MT SMS Trigger message) to accommodate the long delay characteristics of NTN.

Mobile Terminated (MT) Short Message Service (SMS) is a service that allows a mobile phone or other wireless device to receive SMS or MMS messages that have been sent from another mobile phone, web server, PC, or other fixed device. MT messages are also known as outbound SMS. MT messages are typically notifications that are pushed to a device, such as SMS text messages, emails, or social media updates. The server or application is the originator of the message, and the device is the recipient.

A Short Message Service Center (SMSC) is a network element in the mobile telephone network. Its purpose is to store, forward, convert and deliver Short Message Service (SMS) messages.

A Mobile Terminated Forward Short Message (MT-FSM) involves a procedure that forwards mobile terminated (MT) short messages between the SMSC and the serving MME. When the MME receives an MT-FSM request, it checks if the user is known and then attempts to deliver the message to the UE (wireless device). If the UE (wireless device) is not reachable, the MME sets the MNRF (Mobile-Not-Reachable-Flag) flag and returns an Experimental-Result-Code set to DIAMETER_ERROR_ABSENT_USER.

FIG. 1 shows a communication network that includes both terrestrial networks and non-terrestrial networks for communicating to wireless devices WD1 111, WD2 114, according to an embodiment. As shown, a terrestrial network communicates through a terrestrial base station 160 to the wireless device (WD2) 114 through a wireless terrestrial link.

Further, a non-terrestrial network (NTN) communicates through a satellite base station 120 to the wireless device (WD1) 111 through a satellite 110 and a wireless satellite link. A propagation delay D1 between the wireless device WD1 and the satellite base station 120 is substantially greater than a propagation delay D2 between the wireless device WD2 and the terrestrial base station 160. Due to the difference propagation delays D1, D2, latency L2 of communication between the terrestrial base station 160 and the WD2 114 is substantially less than the latency L1 of communication between the satellite base station 120 and the WD1 111.

For an embodiment, the communication network includes a non-terrestrial core network (NTN) 150. For an embodiment, the non-terrestrial core network (NTN) 150 is configured to manage the signaling connection and mobility context and transfers SMS messages between the wireless device (WD1) 111 and the external network entities that are upstream from the non-terrestrial core network (NTN) 150.

For an embodiment, the communication network includes a routing agent 130. For an embodiment, the routing agent 130 is configured to forward SMS messages to a destination wireless device via a best path considering, for example, load balancing.

For an embodiment, the communication network includes a short message service center 140. For an embodiment, the short message service center 140 is a network element in a mobile telephone network. For an embodiment, the short message service center 140 is configured to store, forward, convert and deliver Short Message Service (SMS) messages.

As shown, for an embodiment, the routing agent includes an SMS delivery manager 132. For an embodiment, the SMS delivery manager 132 is configured to receive a mobile terminated forward short message request (TFR) from the short message service center (SMSC) 140, and to forward mobile terminated short messages to a destination wireless device (WD 111), wherein the TFR includes an SMS message and delivery information for the destination wireless device (WD 111).

For an embodiment, the SMS delivery manager 132 is further configured to store the delivery information associated with the TFR, and to compare the delivery information with previously stored delivery information of a previously received TFR and determining whether the TFR includes a new SMS message or an expired SMS message.

For an embodiment, the SMS delivery manager 132 is further configured to forward the TFR to the NTN core network 150 when the delivery information is determined to be associated with a new SMS message, and discard without forwarding subsequent retry TFRs for retry TFRs received from the SMSC 140 before receiving a mobile terminated forward short message answer (TFA) from the NTN core network 150 when the delivery information is determined to be associated with an expired SMS message. For an embodiment, discarding subsequent retry TFRs means not delivering the subsequent retry TFR to the NTN core network 150 when the TFR destined wireless device 111 is under delivering process.

For an embodiment, the delivery information associated with the TFR includes at least one of a transaction identifier, a timestamp, a source, a destination, or Transfer Protocol Data Unit (T-PDU) header information. The transaction identifier uniquely distinguishes the transaction, the timestamp includes a timing of when the TFR is sent to the SMS delivery manager 132, the source includes an identification of where the SMS message is originated, the destination includes an identification of the destination wireless devices, and the Transfer Protocol Data Unit (T-PDU) header information includes SMS transmission information including a unique identifier of the message, message destination address, message originating address, and a message validity period.

For an embodiment, the SMS delivery manager 132 is further configured to receive the TFA from the NTN core network 150 and store a response of the TFA along with associated TFR information. For an embodiment, the SMS delivery manager 132 is further configured to compare the received TFA with the stored information and determine whether a transaction window associated with a most recent TFR has expired based on the comparison of the received TFA with the stored information. For an embodiment, the TFA indicates whether transmission of the SMS message of the TFR was a success or a failure.

For an embodiment, comparing the received TFA with the stored information includes comparing a timestamp, source, and Transfer Protocol Data Unit (T-PDU) header information to match the stored information with delivery information.

For an embodiment, the SMS delivery manager 132 is further configured to construct the TFA of the most recent TFR of the delivery information based on the received TFA to match information from the core network, and forward the constructed TFA to the SMSC when the transaction window of the most recent TFR has not expired.

For an embodiment, the SMS delivery manager 132 is further configured to generate an MT SMS Trigger message to trigger a new TFR from the SMSC 140 when the transaction window has expired. For an embodiment, the MT SMS Trigger message includes a triggering MO SMS. For an embodiment, the MT SMS Trigger message includes an update location request. For an embodiment, the MT-SMS-Trigger message is generated to trigger the SMSC 140 to trigger a new TFR for the destination wireless device.

For an embodiment, the SMS delivery manager 132 is further configured to update the stored information when receiving a retry TFR from the SMSC 140 for the SMS message of the TFR.

It is to be understood that the SMS delivery manager 132 cannot respond to an expired TFR. Therefore, a new TFR from SMSC is needed in order for the SMS delivery manager 132 to respond. For an embodiment, the SMS delivery manager 132 generates a message (MT SMS Trigger message) to trigger a new TFR for the destination wireless device 111. To accomplish this the SMS delivery manager 132 generates a fake SMS (MT SMS Trigger message) for the destination wireless device 111 and transmits the fake SMS (MT SMS Trigger message) to SMSC 140. For an embodiment, upon the SMSC 140 receiving the fake SMS (MT SMS Trigger message), the SMSC 140 sends TFRs to the destination wireless device to accomplish delivery of every SMS message sequentially.

For an embodiment, the SMS delivery manager 132 is further configured to identify and discard any TFRs generated by the SMSC 140 in response to the MT SMS-Trigger message to prevent users (wireless devices) from receiving unnecessary messages.

Figure 2:
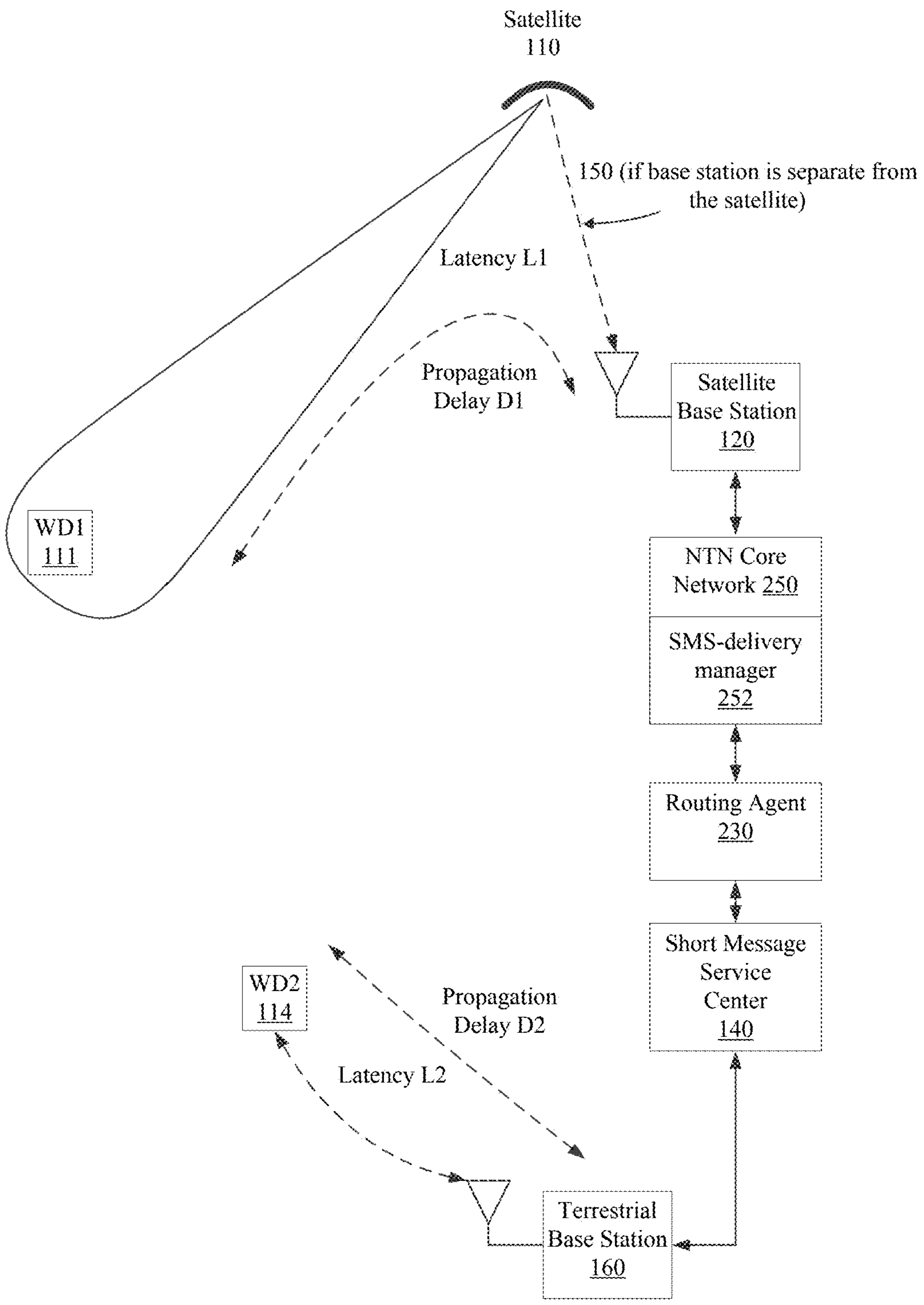
FIG. 2 shows a communication network that includes both terrestrial networks and non-terrestrial networks for communicating to wireless devices, according to another embodiment.

FIG. 2 shows a communication network that includes both terrestrial networks and non-terrestrial networks for communicating to wireless devices, according to another embodiment. FIG. 2 shows an embodiment in which the SMS delivery manager 252 resides within the NTN core network 250.

Figure 3:
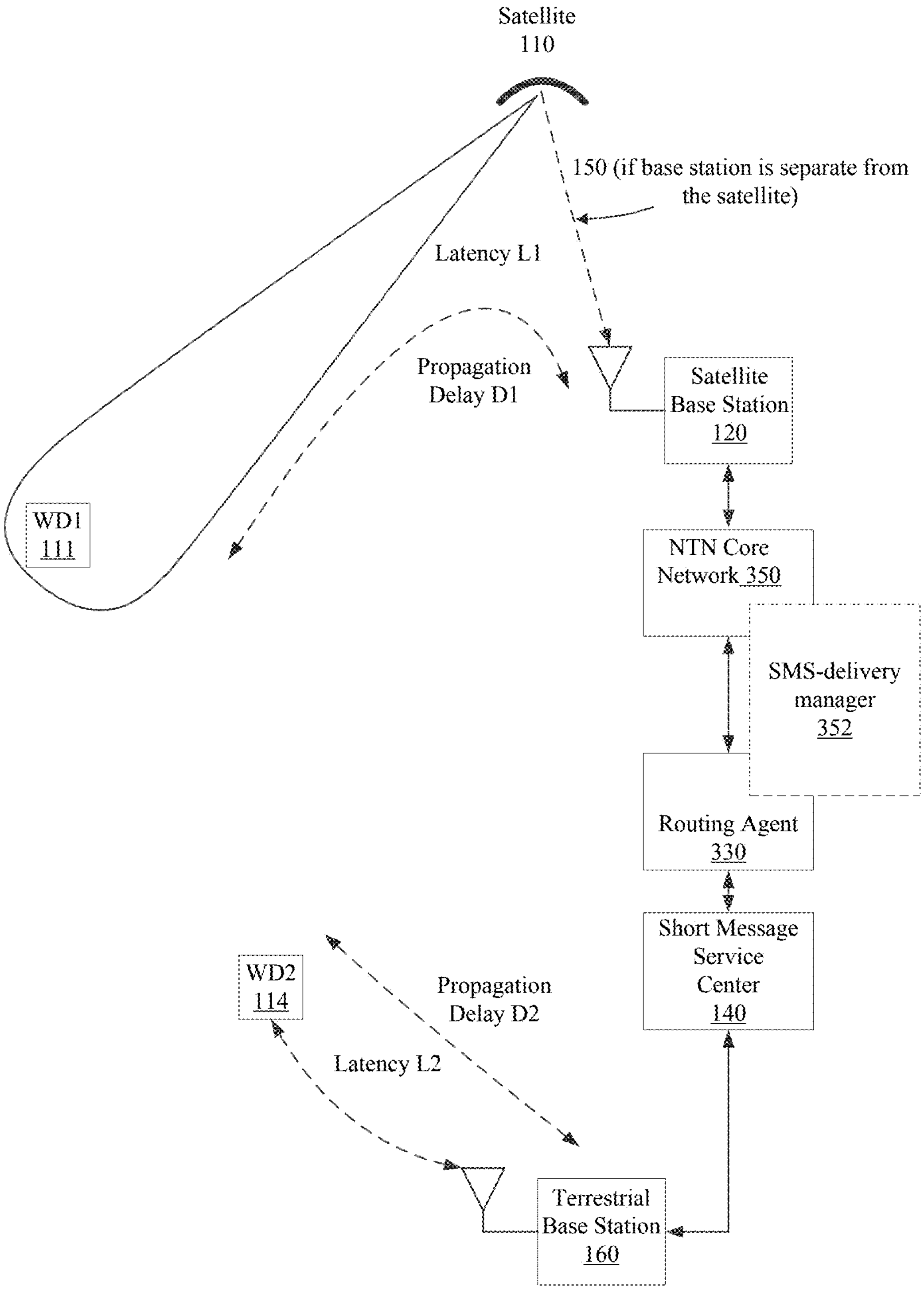
FIG. 3 shows a communication network that includes both terrestrial networks and non-terrestrial networks for communicating to wireless devices, according to another embodiment.

FIG. 3 shows a communication network that includes both terrestrial networks and non-terrestrial networks for communicating to wireless devices, according to another embodiment. FIG. 3 shows an embodiment in which the SMS delivery manager 352 resides within both the routing agent 330 and the NTN core network 350.

Figure 4:
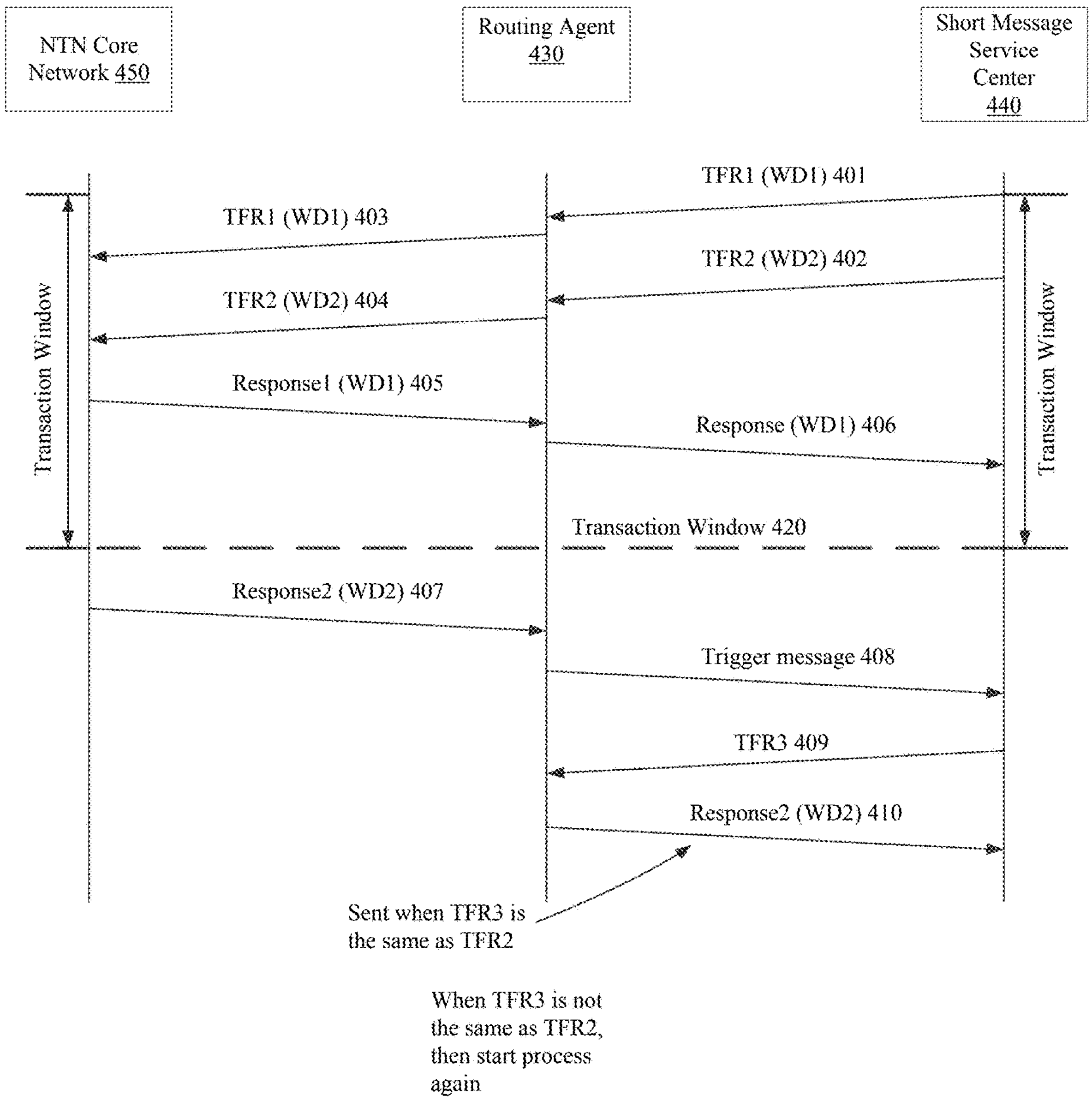
FIG. 4 is a timeline of messaging communication between a Short Message Service Center (SMSC), a routing agent, and a non-terrestrial core network, according to an embodiment.

FIG. 4 is a timeline of messaging communication between a Short Message Service Center (SMSC) 440, a routing agent 430, and a non-terrestrial core network 450, according to an embodiment. It is to be understood that the routing agent 430 of FIG. 4 may be replaced with the described embodiments of the SMS delivery manager. As shown, the short message service center may transmit TFRs (TFR 1 410 (for wireless device (WD1)) and TFR2 420 (for wireless device (WD2)) to the routing agent 430 (SMS delivery manager).

In response to receiving the TFRs 410, 420, the routing agent 430 (SMS delivery manager) stores delivery information associated with each of the TFRs 410, 420. The routing agent 430 (SMS delivery manager) then compares the delivery information with previously stored delivery information of a previously received TFR and determines whether the TFRs 410, 420 includes new SMS messages or expired SMS messages. The routing agent 430 (SMS delivery manager) then forwards the TFRs 403, 404 to the NTN core network 450 when the delivery information is determined to be associated with a new SMS message.

Alternatively (not shown in FIG. 4) the routing agent 430 (SMS delivery manager) discards without forwarding subsequent retry TFRs for retry TFRs received from the SMSC before receiving a mobile terminated forward short message answer (TFA) from the NTN Core Network. when the delivery information is determined to be associated with an expired SMS message.

After delivery of the new SMS messages of the TFRs 410, 420 to destination wireless devices of the satellite network, the NTN core network 450 replies with response 405, 407 (mobile terminated forward short message answer (TFA). As previously described, the TFA indicates whether transmission of the SMS message of the TFR was a success or a failure.

The routing agent 430 (SMS delivery manager) receives the response 405, 407 (TFAs) from the NTN core network 450, and stores the responses 405, 408 of the TFAs along with associated TFR information. The routing agent 430 (SMS delivery manager) then compares the received TFAs with the stored information. For an embodiment, comparing the received TFA with the stored information includes comparing a timestamp, source, and Transfer Protocol Data Unit (T-PDU) header information.

The routing agent 430 (SMS delivery manager) determines whether a transaction window 420 associated with each TFR has expired based on the comparison of the received TFA with the stored information. FIG. 4 shows the response 405 being received before expiration of the transaction window 420 and the response 407 being received after expiration of the transaction window 420.

For the response (TFA) 405 received before the expiration of the transaction window 420, the routing agent 430 (SMS delivery manager) modifies the received TFA to match information of the most recent TFR 401 and forwards the received TFA (response 406) to the SMSC 440.

For the response (TFA) 407 received after the expiration of the transaction window 420, the routing agent 430 (SMS delivery manager) generates an MT SMS Trigger message 408 to trigger a new TFR (TFR 3 409) from the SMSC 440 when the transaction window 420 has expired. That is, the MT-SMS-Trigger message is generated to trigger the SMSC 440 to trigger a new TFR for the destination wireless device 111 wirelessly connected to the NTN core network 450. For an embodiment, the destination wireless device 111 is wirelessly connected to the NTN core network 450 through a RAN (radio access network).

For an embodiment, when receiving a retry TFR from the SMSC for the SMS message of the TFR, information is updated and stored.

For an embodiment, the routing agent 430 (SMS delivery manager) identifies and discards any TFRs generated by the SMSC 440 in response to the MT-SMS-Trigger message. Alternatively, for an embodiment, the routing agent 430 (SMS delivery manager) sends back a response to the SMSC 440 that includes a TFA with failure.

Figure 5:
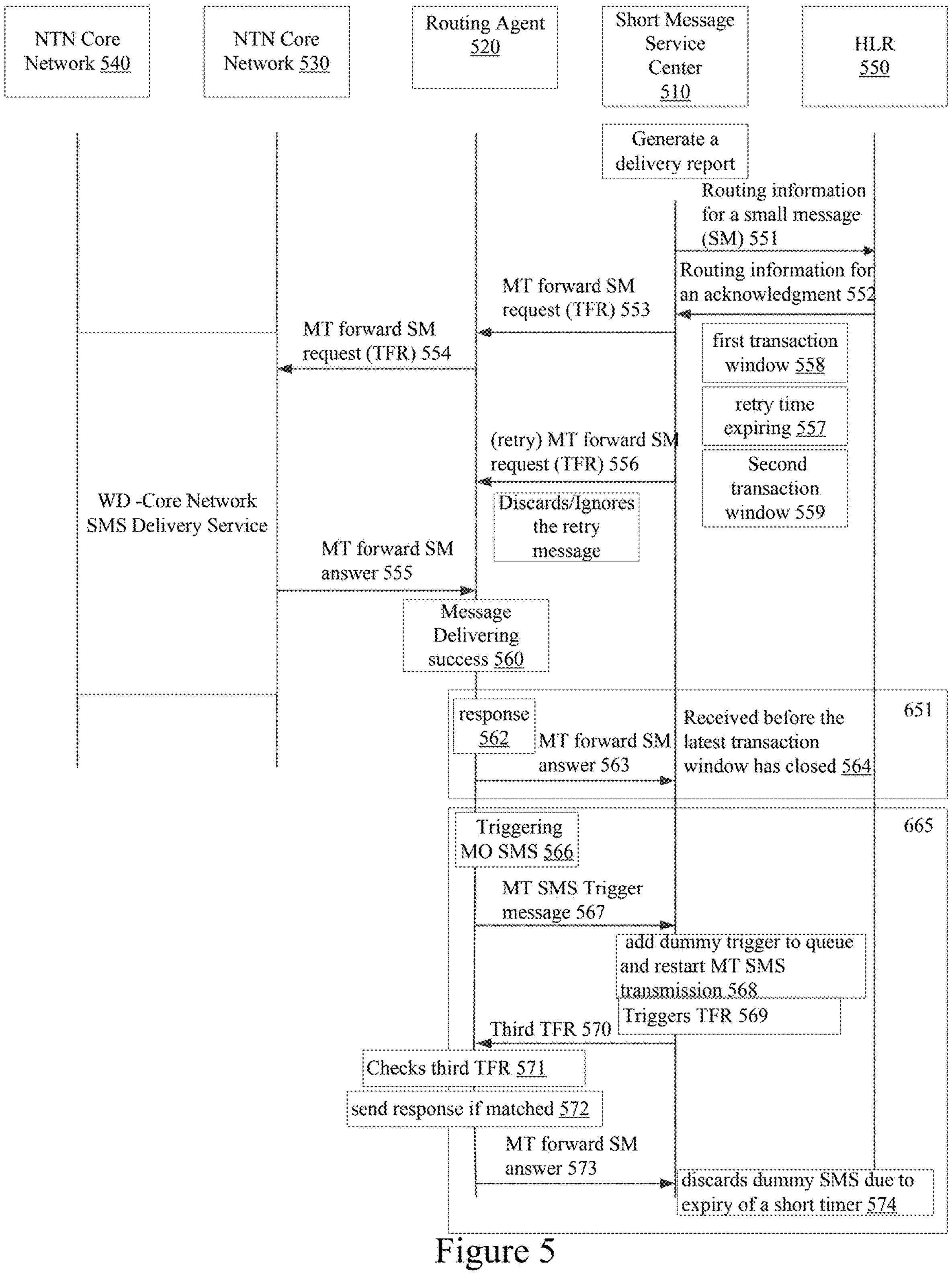
FIG. 5 is a more detailed timeline of messaging communication between a Short Message Service Center (SMSC), a routing agent, a non-terrestrial network, and a wireless device, according to an embodiment.

FIG. 5 is a more detailed timeline of messaging communication between a Short Message Service Center (SMSC) 510, a routing agent 520, a non-terrestrial network (NTN) 530, and a wireless device 540, according to an embodiment. It is to be understood that the routing agent 520 of FIG. 5 may be replaced with the described embodiments of the SMS delivery manager. First the SMSC 510 generates a delivery report for the wireless device 540 and sends 551 routing information for a small message (SM) to a HLR (home location register) 550 of the terrestrial network. The HLR 550 responds with routing information for an acknowledgment 552 of the small message (SM). The SMSC 510 then sends an MT forward SM request (TFR) 553 to the routing agent 520, which forwards the MT forward SM request (TFR) 554 to the NTN 530. The NTN 553 and the wireless device 540 operate to perform a wireless device core network SMS delivery service of the messaging to the wireless device 540.

At a later point in time, the NTN 530 responds with an MT forward SM answer 555 indicating successful delivery of the message to the wireless device. However, during the time between the NTN 530 receiving the MT forward SM request (TFR) 554 from the routing agent 520 and the NTN 530 responding with the MT forward SM answer 555, the SMSC 510 may delivery another (retry) MT forward SM request (TFR) 556 to the routing agent 520 which is triggered by a retry time 557 expiring. The routing agent 520 discards and ignores the (retry) MT forward SM request (TFR) 556 if received before receiving the MT forward SM answer 555.

It is to be observed that transaction windows 558, 559 are started for each of the MT forward SM request (TFR) 554 and the retry MT forward SM request (TFR) 556. That is, a first transaction window 558 is started for the MT forward SM request (TFR) 554, and a second transaction window 559 is started for the retry MT forward SM request (TFR) 556.

When the routing agent 520 determines 560 that the MT forward SM answer 555 indicates successful delivery of the message to the wireless device, either the latest 559 of the transaction windows 558, 559 has expired or it has not expired. If the latest transaction window 559 has not expired, then a first set of conditions 561 is performed by the routing agent 520 including sending a response 562 which includes an MT forward SM answer 563 to the last received MT forward SM request (TFR) 556 which is received by the SMSC 510 before 564 the latest transaction window 559 has closed (expired).

If the latest transaction window 559 of the lastly received retry MT forward SM request (TFR) 556 has closed, then a second set of conditions 565 is performed. The set of conditions include the routing agent 520 sending a triggering MO SMS message 566 in the form of an MT SMS Trigger message 567. The SMSC 510 then adds 568 the dummy SMS trigger to a queue and an MT SMS transmission to the wireless device 540 is restarted. Further, the SMSC 510 initiates (triggers) 569 another (third) MT forward SM request (TFR) 570 to the routing agent 520. The routing agent 520 then checks 571 the (third) MT forward SM request (TFR) 570 with stored information. If the (third) MT forward SM request (TFR) 570 is matched 572 with a response from the NTN network 530 of a successfully received message, the routing agent 520 sends an MT forward SM answer 573 which is received by the SMSC 510. The SMSC 510 then discards 574 the dummy SMS due to expiry of a short timer of the SMS.

Figure 6:
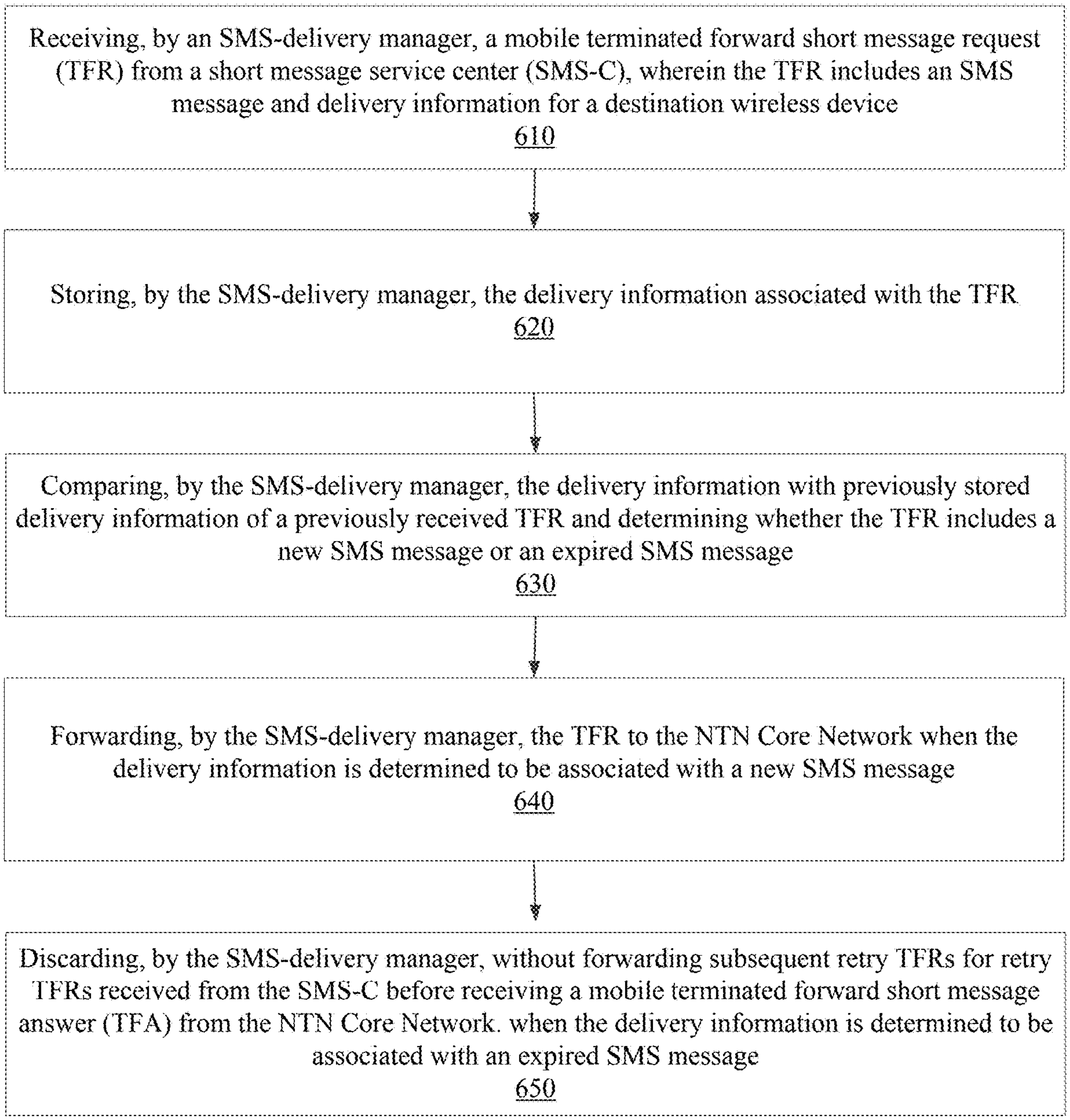
FIG. 6 is a flow chart that includes steps of a method for a routing agent for non-terrestrial network (NTN) short message service (SMS), according to an embodiment.

FIG. 6 is a flow chart that includes steps of a method for a routing agent for non-terrestrial network (NTN) short message service (SMS), according to an embodiment. A first step 610 includes receiving, by an SMS delivery manager, a mobile terminated forward short message request (TFR) from a short message service center (SMSC), wherein the TFR includes an SMS message and delivery information for a destination wireless device. A second step 620 includes storing, by the SMS delivery manager, the delivery information associated with the TFR. A third step 630 includes comparing, by the SMS delivery manager, the delivery information with previously stored delivery information of a previously received TFR and determining whether the TFR includes a new SMS message or an expired SMS message. A fourth step 640 includes forwarding, by the SMS delivery manager, the TFR to the NTN Core Network when the delivery information is determined to be associated with a new SMS message. A fifth step 650 includes discarding, by the SMS delivery manager, without forwarding subsequent retry TFRs for retry TFRs received from the SMSC before receiving a mobile terminated forward short message answer (TFA) from the NTN Core Network. when the delivery information is determined to be associated with an expired SMS message.

As previously described, for an embodiment, the delivery information associated with the TFR includes at least one of a transaction identifier, a timestamp, a source, a destination, or Transfer Protocol Data Unit (T-PDU) header information.

As previously described, at least some embodiments further include receiving, by the SMS delivery manager, the TFA from the NTN core network, storing a response of the TFA along with associated TFR information, comparing, by the by the SMS delivery manager, the received TFA with the stored information, and determining, by the SMS delivery manager, whether a transaction window associated with a most recent TFR has expired based on the comparing of the received TFA with the stored information.

As previously described, for an embodiment, the TFA indicates whether transmission of the SMS message of the TFR was a success or a failure. As previously described, for an embodiment, comparing the received TFA with the stored information comprises comparing a timestamp, source, and Transfer Protocol Data Unit (T-PDU) header information. As previously described, at least some embodiments further include modifying the received TFA to match information of the most recent TFR and forwarding the received TFA to the SMSC when the transaction window has not expired. As previously described, at least some embodiments further include generating an MT SMS Trigger message to trigger a new TFR from the SMSC when the transaction window has expired.

As previously described, at least some embodiments further include updating the stored information when receiving a retry TFR from the SMSC for the SMS message of the TFR. As previously described, for an embodiment, the MT-SMS-Trigger message is generated to trigger the SMSC to trigger a new TFR for the destination wireless device.

As previously described, the SMS delivery manager cannot respond to an expired TFR. Therefore, a new TFR from SMSC is needed in order for the SMS delivery manager to respond. For an embodiment, the SMS delivery manager generates a message (MT SMS Trigger message) to trigger a new TFR for the destination wireless device. To accomplish this the SMS delivery manager generates a fake SMS (MT SMS Trigger message) for the destination wireless device and transmits the fake SMS (MT SMS Trigger message) to SMSC. For an embodiment, upon the SMSC receiving the fake SMS (MT SMS Trigger message), the SMSC sends TFRs to the destination wireless device for delivery of every SMS message sequentially.

As previously described, at least some embodiments further include identifying and discarding, by the SMS delivery manager, any TFRs generated by the SMSC in response to the MT-SMS-Trigger message.

Although specific embodiments have been described and illustrated, the embodiments are not to be limited to the specific forms or arrangements of parts so described and illustrated. The described embodiments are to only be limited by the claims.

What is claimed:

1. A method for delivering Mobile Terminated Short Message Service (MT-SMS) messages in a non-terrestrial network (NTN), the method comprising:

receiving, by an SMS delivery manager, a mobile terminated forward short message request (TFR) from a short message service center (SMSC), wherein the TFR includes an SMS message and delivery information for a destination wireless device;

storing, by the SMS delivery manager, the delivery information associated with the TFR;

comparing, by the SMS delivery manager, the delivery information with previously stored delivery information of a previously received TFR and determining whether the TFR includes a new SMS message or an expired SMS message;

forwarding, by the SMS delivery manager, the TFR to the NTN Core Network when the delivery information is determined to be associated with a new SMS message; and discarding, by the SMS delivery manager, without forwarding subsequent retry TFRs for retry TFRs received from the SMSC before receiving a mobile terminated forward short message answer (TFA) from the NTN Core Network. when the delivery information is determined to be associated with an expired SMS message.

2. The method of claim 1, wherein the delivery information associated with the TFR includes at least one of a transaction identifier, a timestamp, a source, a destination, or Transfer Protocol Data Unit (T-PDU) header information.

3. The method of claim 1, further comprising:

receiving, by the SMS delivery manager, the TFA from the NTN core network;

storing a response of the TFA along with associated TFR information;

comparing, by the by the SMS delivery manager, the received TFA with the stored information; and determining, by the SMS delivery manager, whether a transaction window associated with a most recent TFR has expired based on the comparing of the received TFA with the stored information.

4. The method of claim 1, wherein the TFA indicates whether transmission of the SMS message of the TFR was a success or a failure.

5. The method of claim 3, wherein comparing the received TFA with the stored information comprises comparing a timestamp, source, and Transfer Protocol Data Unit (T-PDU) header information.

6. The method of claim 3, further comprising:

modifying the received TFA to match information of the most recent TFR and forwarding the received TFA to the SMSC when the transaction window has not expired.

7. The method of claim 3, further comprising:

generating an MT SMS Trigger message to trigger a new TFR from the SMSC when the transaction window has expired.

8. The method of claim 1, further comprising:

updating the stored information when receiving a retry TFR from the SMSC for the SMS message of the TFR.

9. The method of claim 7, wherein the MT-SMS-Trigger message is generated to trigger the SMSC to trigger a new TFR for the destination wireless device.

10. The method of claim 7, further comprising:

identifying and discarding, by the SMS delivery manager, any TFRs generated by the SMSC in response to the MT-SMS-Trigger message.

11. A system for delivering Mobile Terminated Short Message Service (MT-SMS) in a Non-Terrestrial Network (NTN), the system comprising:

a short message service center;

a routing agent;

a NTN core network:

an SMS delivery manager operating on the routing agent and the NTN core network to cause the routing agent and the NTN core network to:

receive a mobile terminated forward short message request (TFR) from a short message service center (SMSC), wherein the TFR includes an SMS message and delivery information for a destination wireless device;

store the delivery information associated with the TFR;

compare the delivery information with previously stored delivery information of a previously received TFR and determining whether the TFR includes a new SMS message or an expired SMS message;

forward the TFR to the NTN Core Network when the delivery information is determined to be associated with a new SMS message; and discard forwarding subsequent retry TFRs for retry TFRs received from the SMSC before receiving a mobile terminated forward short message answer (TFA) from the NTN Core Network. when the delivery information is determined to be associated with an expired SMS message.

12. The system of claim 11, wherein the delivery information associated with the TFR includes at least one of a transaction identifier, a timestamp, a source, a destination, or Transfer Protocol Data Unit (T-PDU) header information.

13. The system of claim 11, wherein the SMS delivery manager operating on the routing agent and the NTN core network further cause the routing agent and the NTN core network to:

receive the TFA from the NTN core network;

store a response of the TFA along with associated TFR information;

compare the received TFA with the stored information; and determine whether a transaction window associated with a most recent TFR has expired based on the comparing of the received TFA with the stored information.

14. The system of claim 11, wherein the TFA indicates whether transmission of the SMS message of the TFR was a success or a failure.

15. The system of claim 13, wherein comparing the received TFA with the stored information comprises comparing a timestamp, source, and Transfer Protocol Data Unit (T-PDU) header information.

16. The system of claim 13, wherein the SMS delivery manager operating on the routing agent and the NTN core network further cause the routing agent and the NTN core network to:

modify the received TFA to match information of the most recent TFR and forwarding the received TFA to the SMSC when the transaction window has not expired.

17. The system of claim 13, wherein the SMS delivery manager operating on the routing agent and the NTN core network further cause the routing agent and the NTN core network to:

generate an MT SMS Trigger message to trigger a new TFR from the SMSC when the transaction window has expired.

18. The system of claim 13, wherein the SMS delivery manager operating on the routing agent and the NTN core network further cause the routing agent and the NTN core network to:

update the stored information when receiving a retry TFR from the SMSC for the SMS message of the TFR.

19. The system of claim 17, wherein the MT-SMS-Trigger message is generated to trigger the SMSC to trigger a new TFR for the destination wireless device.

20. The system of claim 17, wherein the SMS delivery manager operating on the routing agent and the NTN core network further cause the routing agent and the NTN core network to:

identify and discard any TFRs generated by the SMSC in response to the MT-SMS-Trigger message.

* * * * *